(12) United States Patent
Toyama et al.

(10) Patent No.: US 8,998,189 B2
(45) Date of Patent: Apr. 7, 2015

(54) WAVE WASHER, ROTARY SHAFT SUPPORTING DEVICE INCLUDING THE WAVE WASHER, AND ELECTRIC MOTOR INCLUDING THE ROTARY SHAFT SUPPORTING DEVICE

(71) Applicant: JTEKT Corporation, Osaka-shi, Osaka (JP)

(72) Inventors: Yuichi Toyama, Owariasahi (JP); Hiroyuki Takahashi, Okazaki (JP); Kosuke Tsukahara, Okazaki (JP); Fumihiro Kawakami, Okazaki (JP); Tomohiro Niwa, Okazaki (JP); Yoshinobu Muramoto, Toyoake (JP); Naoki Kinouchi, Okazaki (JP); Takaya Tanikawa, Toyohashi (JP)

(73) Assignee: JTEKT Corporation, Kariya-shi (JP)

( * ) Notice: Subject to any disclaimer, the term of this patent is extended or adjusted under 35 U.S.C. 154(b) by 0 days.

(21) Appl. No.: 13/946,251

(22) Filed: Jul. 19, 2013

(65) Prior Publication Data
US 2014/0029884 A1   Jan. 30, 2014

(30) Foreign Application Priority Data
Jul. 27, 2012   (JP) .................. 2012-167738

(51) Int. Cl.
| | |
|---|---|
| *F16F 1/20* | (2006.01) |
| *H02K 5/16* | (2006.01) |
| *F16C 33/66* | (2006.01) |
| *F16C 33/30* | (2006.01) |
| *B62D 5/04* | (2006.01) |
| *F16C 25/08* | (2006.01) |
| *F16F 1/32* | (2006.01) |
| *H02K 5/173* | (2006.01) |
| *H02K 7/08* | (2006.01) |
| *F16C 19/54* | (2006.01) |

(Continued)

(52) U.S. Cl.
CPC .............. *F16C 33/30* (2013.01); *B62D 5/0409* (2013.01); *F16C 25/083* (2013.01); *F16F 1/328* (2013.01); *H02K 5/1732* (2013.01); *F16C 19/542* (2013.01); *H02K 7/081* (2013.01); *F16F 1/324* (2013.01)

(58) Field of Classification Search
CPC .... F16C 25/083; F16C 2380/26; F16C 33/30; F16C 19/452; F16F 1/324; F16F 1/328; H02K 5/1732; H02K 7/081; B62D 5/0409
USPC .................. 384/517, 490; 267/159, 161–165; 310/90
See application file for complete search history.

(56) References Cited

U.S. PATENT DOCUMENTS
3,934,957 A * 1/1976 Derner .......................... 384/563
4,364,615 A * 12/1982 Euler ............................ 384/517
(Continued)

FOREIGN PATENT DOCUMENTS
JP   2004169793   *   6/2004
JP   A-2009-201255   9/2009

OTHER PUBLICATIONS
Machine Translation of JP 2004-169793 dated Jun. 2004.*

*Primary Examiner* — Alan B Waits
(74) *Attorney, Agent, or Firm* — Oliff PLC (57) ABSTRACT

A wave washer is used for a shaft supporting device of an electric power steering system. The wave washer has an annular portion and six outward protrusions. The annular portion has first protrusions that protrude in a first axial direction and second protrusions that are formed so as to continuous with the first protrusions and that protrude in a second axial direction. Each outward protrusion protrudes from an outer periphery of the annular portion in a radially outward direction of the radial direction of the annular portion.

7 Claims, 8 Drawing Sheets

(56) References Cited

U.S. PATENT DOCUMENTS

| | | | |
|---|---|---|---|
| 5,624,193 A * | 4/1997 | Vogelsberger et al. | 384/517 |
| 6,375,360 B1 * | 4/2002 | Weisskopf et al. | 384/538 |
| 6,540,406 B1 * | 4/2003 | Matsuoka | 384/517 |
| 7,153,031 B2 * | 12/2006 | Jones | 384/517 |
| 7,217,106 B2 * | 5/2007 | Tanaka et al. | 417/410.1 |
| 7,800,265 B2 * | 9/2010 | Nishikawa et al. | 310/90 |
| 8,602,656 B2 * | 12/2013 | Mashino et al. | 384/517 |
| 2006/0062505 A1 * | 3/2006 | Hoefs | 384/517 |

* cited by examiner

WAVE WASHER, ROTARY SHAFT SUPPORTING DEVICE INCLUDING THE WAVE WASHER, AND ELECTRIC MOTOR INCLUDING THE ROTARY SHAFT SUPPORTING DEVICE

INCORPORATION BY REFERENCE/RELATED APPLICATION

This application claims priority to Japanese Patent Application No. 2012-167738 filed on Jul. 27, 2012 the disclosure of which, including the specification, drawings and abstract, is incorporated herein by reference in its entirety.

BACKGROUND OF THE INVENTION

1. Field of the Invention

The invention relates to a wave washer, a rotary shaft supporting device including the wave washer, and an electric motor including the rotary shaft supporting device.

2. Description of Related Art

Japanese Patent Application Publication No. 2009-201255 (JP 2009-201255 A) describes an electric motor that includes a wave washer located between a rolling bearing for a rotary shaft and a holding case. The wave washer applies a load to the rolling bearing.

The wave washer has such an outer diameter that a clearance is formed between the wave washer and the holding case. If the central axis of the wave washer is offset from the central axis of the rolling bearing, a non-uniform load is applied to the rolling bearing by the wave washer. Therefore, the positional offset between the wave washer and the rolling bearing should be as small as possible. Note that, any wave washers that apply loads to target members other than rolling bearings may also have a similar problem.

SUMMARY OF THE INVENTION

The invention provides a wave washer configured to reduce the positional offset between the wave washer and a target member, a rotary shaft supporting device including the wave washer, and an electric motor including the rotary shaft supporting device.

According to a feature of an example of the invention, a wave washer includes: an annular portion having a first protrusion that protrudes toward one side in an axial direction of the wave washer, and a second protrusion that is formed so as to be continuous with the first protrusion and that protrudes toward the other side in the axial direction; and a plurality of outward protrusions that protrude outward from an outer periphery of the annular portion in a radial direction of the annular portion

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
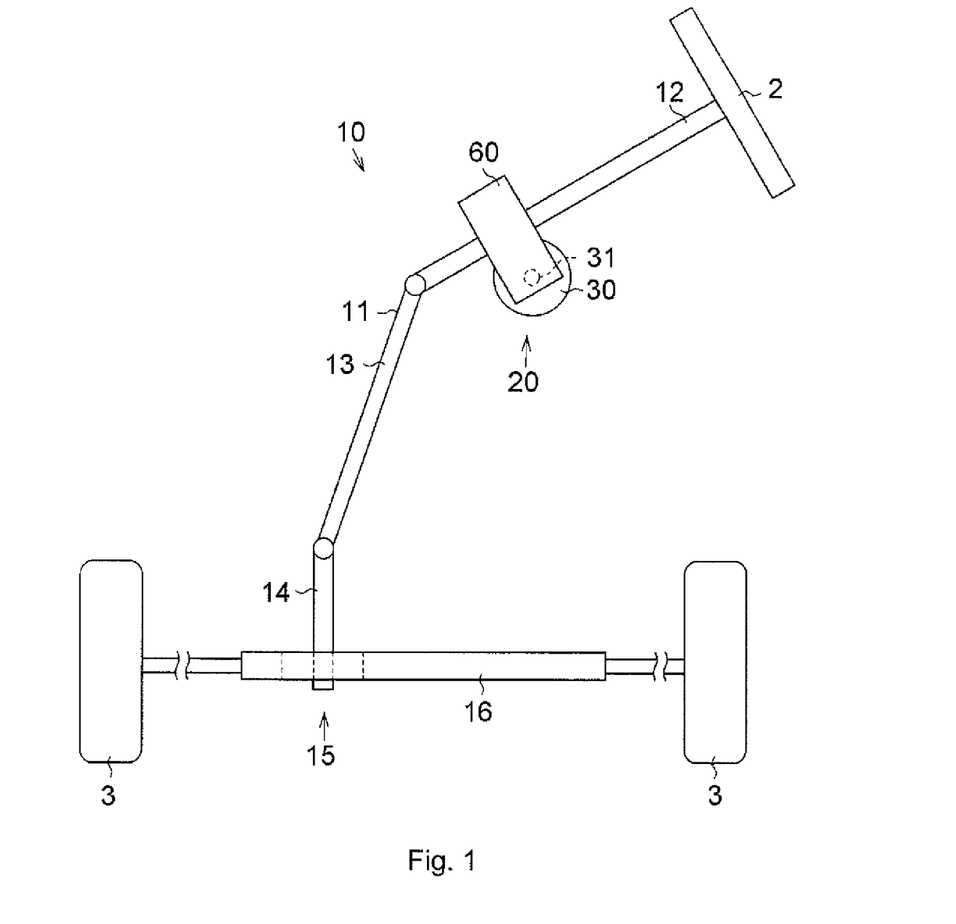
FIG. 1 is a schematic view illustrating the schematic structure of an electric power steering system according to an embodiment of the invention.

With reference to FIG. 1, the configuration of an electric power steering system 1 will be described. The electric power steering system 1 includes a steering wheel 2, front wheels 3, a steering apparatus 10, an assist device 20, and a speed reducer 60.

The steering wheel 2 transmits torque to a column shaft 12 of the steering apparatus 10. The steering apparatus 10 changes the steered angle of the front wheels 3. The assist device 20 applies torque to the column shaft 12. The speed reducer 60 transmits the rotation output from an electric motor 30 to the column shaft 12. In the electric power steering system 1, the electric motor 30 of the assist device 20 is controlled on the basis of the steering torque input in the column shaft 12 and the travelling speed.

The steering apparatus 10 includes a steering shaft 11, a rack-and-pinion mechanism 15, and a rack shaft 16. The steering shaft 11 includes the column shaft 12, an intermediate shaft 13, and a pinion shaft 14. The rack-and-pinion mechanism 15 is connected to the pinion shaft 14. The rack shaft 16 is connected to the rack-and-pinion mechanism 15 and the front wheels 3 to change the steered angle of the front wheels 3.

Figure 2:
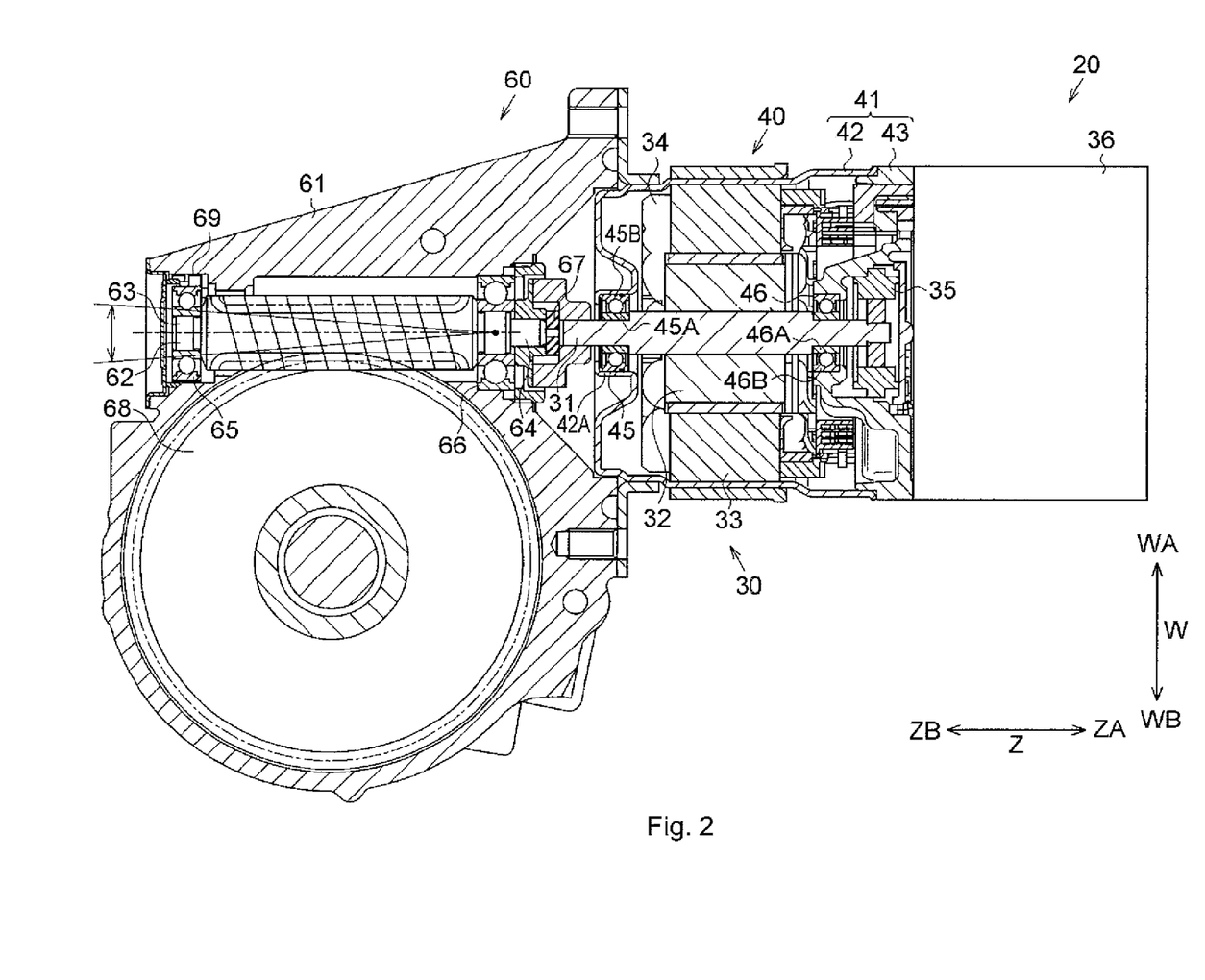
FIG. 2 is a sectional view illustrating an assist device in the embodiment.

With reference to FIG. 2, the configuration of the assist device 20 will be described. Note that, the directions regarding the assist device 20 and components near the assist device 20 will be defined as described in (A) and (B) below.

(A) An axial direction of a rotary shaft 31 will be defined as "axial direction Z". A direction in the axial direction Z, which extends from a worm shaft 62 side toward an electric motor 30 side, will be defined as "first axial direction ZA". A direction in the axial direction Z, which extends from the electric motor 30 side toward the worm shaft 62 side, will be defined as "second axial direction ZB".

(B) A direction orthogonal to the axial direction Z will be defined as "direction W". A direction in the direction W, which extends from a worm wheel 68 side to a worm shaft 62 side, will be defined as "first direction WA". A direction in the direction W, which extends from the worm shaft 62 side to the worm wheel 68 side, will be defined as "second direction WB".

The assist device 20 includes the electric motor 30 that applies torque to the column shaft 12. The electric motor 30 includes the rotary shaft 31, a rotor 32, a stator 33, coils 34, a resolver 35, a substrate housing 36, a rotary shaft supporting device 40, and the speed reducer 60. The resolver 35 detects a rotation angle of the rotary shaft 31. The substrate housing 36 accommodates a drive circuit (not shown) of the electric motor 30.

Figure 3:
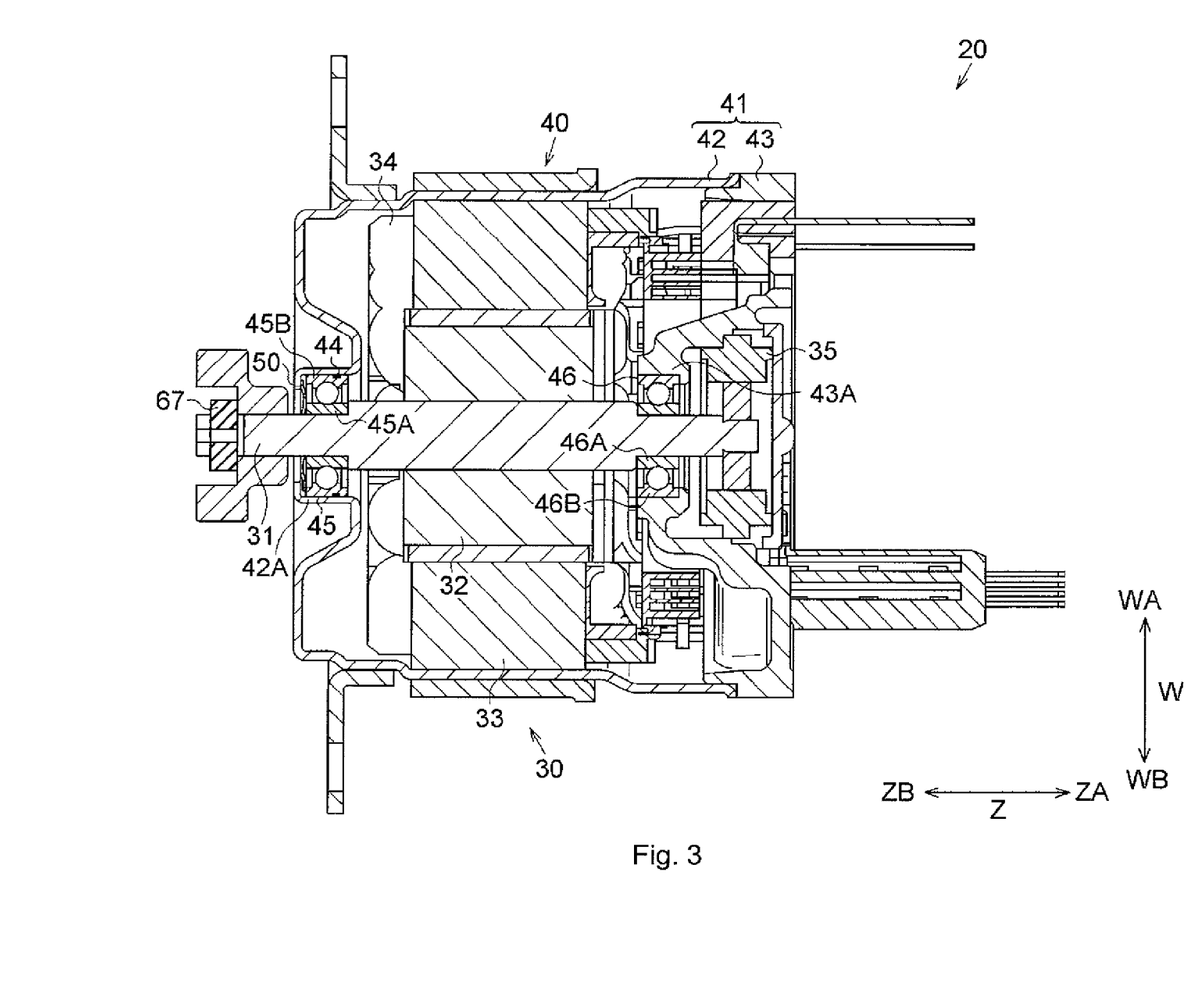
FIG. 3 is a sectional view illustrating a rotary shaft supporting device and an electric motor in the embodiment.

With reference to FIG. 3, the configuration of the rotary shaft supporting device 40 will be described. The rotary shaft supporting device 40 includes a holding case 41, an O-ring 44, a front bearing 45, a rear bearing 46, and a wave washer 50. The front bearing 45 may function as "rolling bearing" in the invention.

The electric motor 30, the front bearing 45, the rear bearing 46, the O-ring 44, and the wave washer 50 are accommodated in an accommodation space in the holding case 41. The holding case 41 has a rotor housing 43 and a stator housing 42. The holding case 41 is fitted to the substrate housing 36.

The stator housing 42 is arranged radially outward of the stator 33 to support the stator 33. The stator housing 42 has a holding portion 42A that holds the wave washer 50 and the front bearing 45.

The rotor housing 43 is fitted, at its end portion in the first axial direction ZA, to the substrate housing 36. The rotor housing 43 is fitted, at its end portion in the second axial direction ZB, to the stator housing 42. The rotor housing 43 supports the rear bearing 46 and the resolver 35. The rotor housing 43 has a bearing holding portion 43A that holds the rear bearing 46.

The front bearing 45 supports a portion of the rotary shaft 31, which is closer to the front end of the rotary shaft 31 than the rotor 32 in the second axial direction ZB. The front bearing 45 includes a front inner ring 45A and a front outer ring 45B.

The front inner ring 45A is press-fitted to the rotary shaft 31. The front outer ring 45B is clearance-fitted to the holding portion 42A. The O-ring 44 is arranged between the outer periphery of the front outer ring 45B and the inner periphery of the holding portion 42A.

The rear bearing 46 supports a portion of the rotary shaft 31, which is closer to the rear end of the rotary shaft 31 than the rotor 32 in the first axial direction ZA. The rear bearing 46 has a rear inner ring 46A and a rear outer ring 46B. The rear inner ring 46A is press-fitted to the rotary shaft 31. The rear outer ring 46B is inserted into the holding case 41 by clearance fit, and is then held by the holding case 41.

The wave washer 50 is arranged between the front bearing 45 and the holding portion 42A. The wave washer 50 applies a load headed in the first axial direction ZA, to the front bearing 45.

Figure 4:
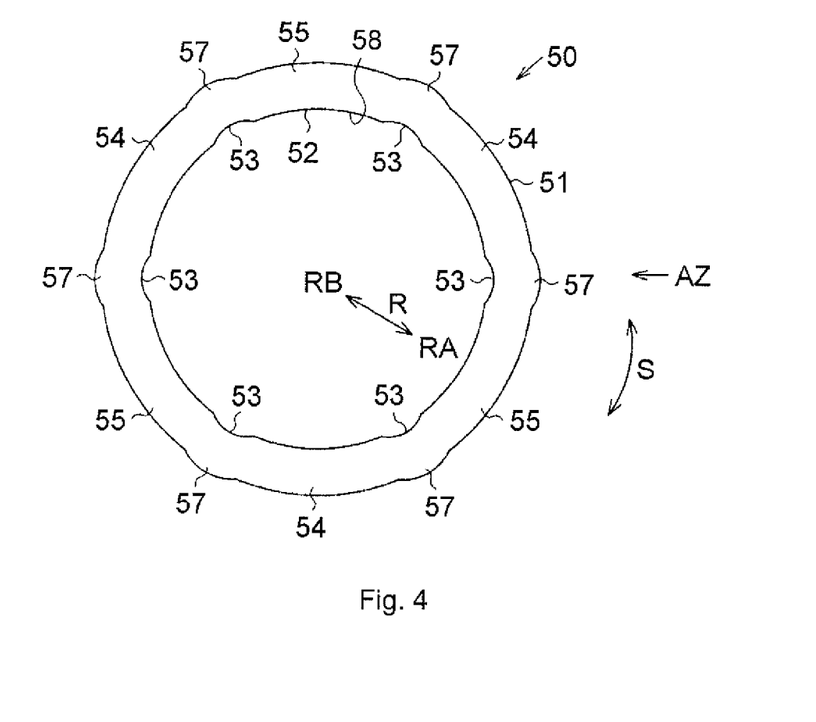
FIG. 4 is a front view illustrating a wave washer in the embodiment.

As shown in FIG. 4, the wave washer 50 has an annular portion 51, six outward protrusions 57, and an insertion hole 58. The directions regarding the wave washer 50 will be defined as described in (C) and (D) below.

(C) A radial direction of the wave washer 50 will be defined as "radial direction R". A direction in the radial direction R, which extends outward from the center of the wave washer 50, will be defined as "radially outward direction RA". A direction in the radial direction R, which extends from the outer side of the wave washer 50 to the center of the wave washer 50, will be defined as "radially inward direction RB".

(D) A circumferential direction of the wave washer 50 will be defined as "circumferential direction S".

The rotary shaft 31 (see FIG. 3) of the electric motor 30 is inserted into the insertion hole 58. The annular portion 51 has an annular shape. The annular portion 51 has three first protrusions 54, three second protrusions 55, and inner periphery concave portions 53. The first protrusions 54 and the second protrusions 55 are formed such that each first protrusion 54 and the second protrusions 55 adjacent to the first protrusion 54 are continuous with each other. A portion of the first protrusions 54, which is close to the second protrusion 55, and a portion of the second protrusion 55, which is close to the first protrusion 54, constitute a connection portion 56 (see FIG. 5).

At the inner periphery concave portions 53, an inner periphery 52 of the wave washer 50 is recessed in the radially outward direction RA of the radial direction R. The inner periphery concave portions 53 are formed at positions inward of the outward protrusions 57 in the radial direction R.

Figure 5:
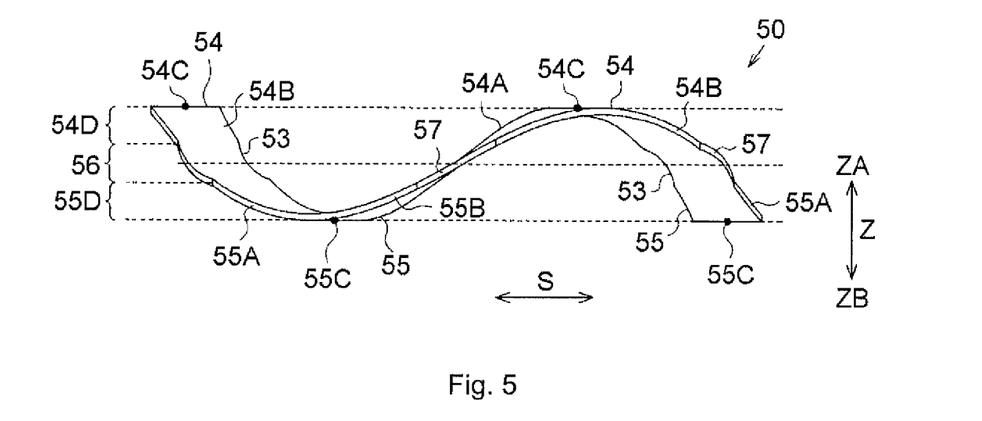
FIG. 5 is a view illustrating the wave washer as viewed from a direction of an arrow AZ in FIG. 4.

As shown in FIG. 5, each first protrusion 54 protrudes in the first axial direction ZA of the wave washer 50. Each first protrusion 54 has a first slant portion 54A, a second slant portion 54B, and a top portion 54C. Each first slant portion 54A extends from the side in the second axial direction ZB to the side in the first axial direction ZA, in a direction toward one side in the circumferential direction S of the wave washer 50.

Each second slant portion 54B extends from the side in the first axial direction ZA to the side in the second axial direction ZB, in the direction toward the one side in the circumferential direction S of the wave washer 50. The boundary between the first slant portion 54A and the second slant portion 54B is located at a top 54D at which the first protrusion 54 protrudes most in the first axial direction ZA.

The top portion 54C is formed of the top 54D and a portion near the top 54D in the first slant portion 54A and the second slant portion 54B. Each second protrusion 55 protrudes in the second axial direction ZB of the wave washer 50. Each second protrusion 55 has a first slant portion 55A, a second slant portion 55B, and a top portion 55C.

Each first slant portion 55A extends from the side in the second axial direction ZB to the side in the first axial direction ZA, in a direction toward one side in the circumferential direction S of the wave washer 50. Each second slant portion 55B extends from the side in the first axial direction ZA to the side in the second axial direction ZB, in the direction toward the one side in the circumferential direction S of the wave washer 50.

The boundary between the first slant portion 55A and the second slant portion 55B is located at a top 55D at which the second protrusion 55 protrudes most in the second axial direction ZB. The top portion 55C is formed of the top 55D and a portion near the top 55D in the first slant portion 55A and the second slant portion 55B.

The connection portion 56 connects the top portion 54C and the top portion 55C to each other. Each connection portion 56 is formed of a portion of the second slant portion 54B and a portion of the first slant portion 55A, the second slant portion 54B and the first slang portion 55A being adjacent to each other, or is formed of a portion of the second slant portion 55B and a portion of the first slant portion 54A, the second slant portion 55B and the first slant portion 54A being adjacent to each other.

Each top portion 54C is a portion corresponding to one-third of the wave washer 50, which is on the side in the first axial direction ZA of the axial direction Z. Each top portion 55C is a portion corresponding to one-third of the wave washer 50, which is on the side in the second axial direction ZB of the axial direction Z. Each connection portion 56 is a portion corresponding to one-third of the wave washer 50, which is located between the top portion 54C and the top portion 55C in the axial direction Z.

Figure 6:
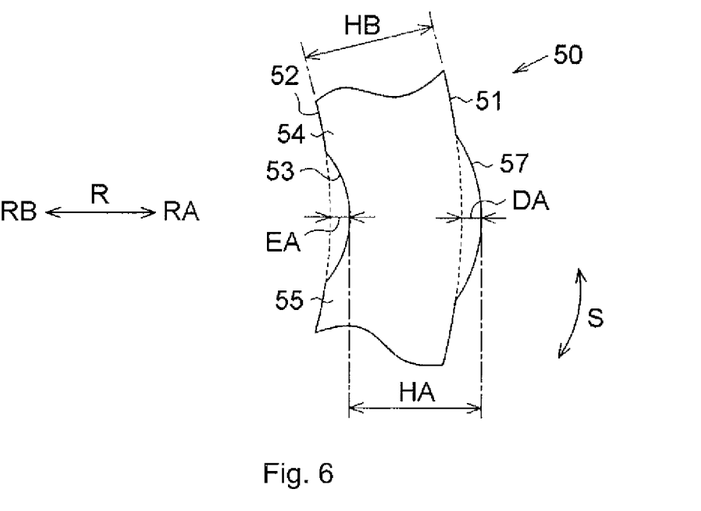
FIG. 6 is a partially-enlarged front view of the wave washer in FIG. 4.

The center position of each outward protrusion 57 in the axial direction Z coincides with the center position of the wave washer 50 in the axial direction Z. As shown in FIG. 6, each outward protrusion 57 has an arc shape that coincides with the shape of each inner periphery concave portion 53.

A maximum protruded amount DA of each outward protrusion 57 is equal to a maximum recessed amount EA of each inner periphery concave portion 53. Therefore, the wave washer 50 is configured such that a width HA, which is the size of a portion having the outward protrusion 57 in the radial direction R, is equal to a width HB, which is the size of a portion without the outward protrusion 57 in the radial direction R. That is, the size of the wave washer 50 in the radial direction R is constant.

Figure 7:
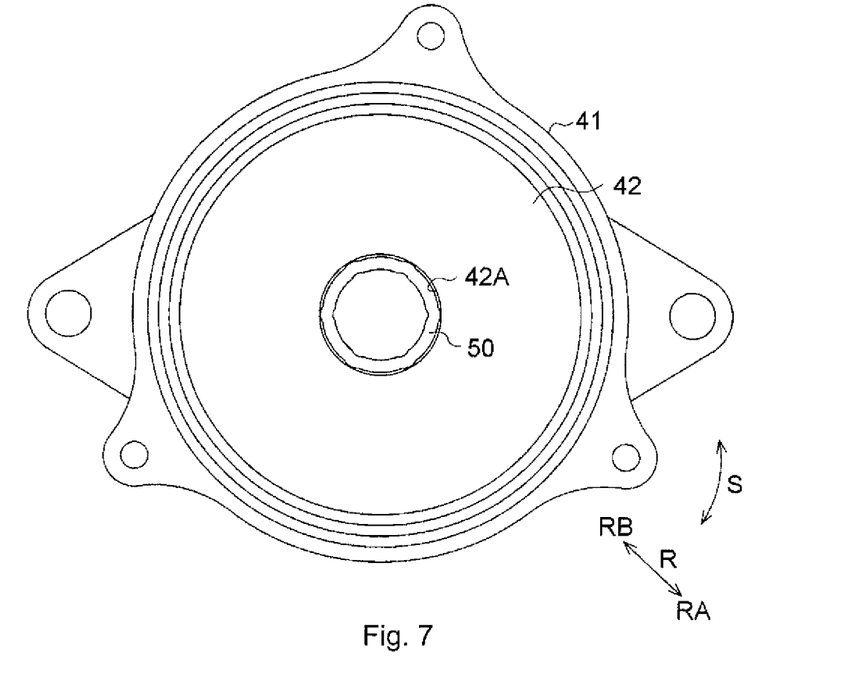
FIG. 7 is a sectional view illustrating a state where the wave washer is arranged in a holding case in the embodiment.
Figure 8:
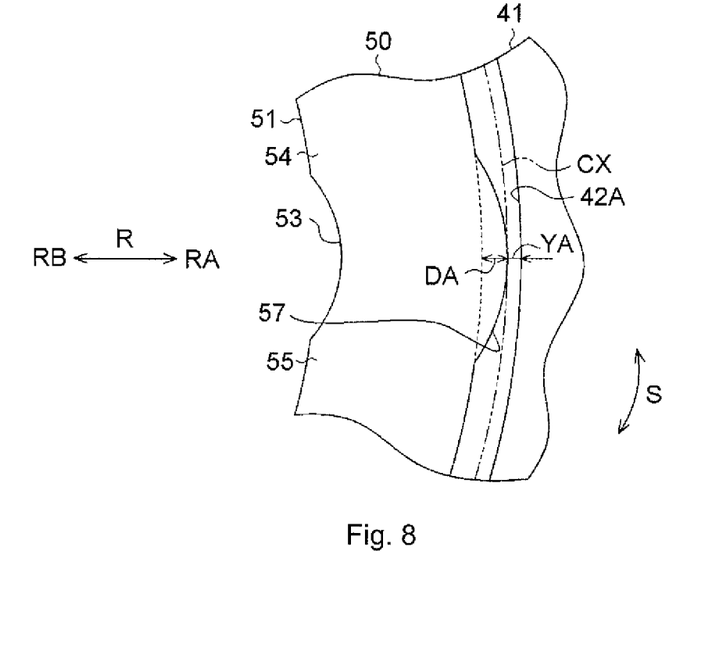
FIG. 8 is a partially-enlarged sectional view of the wave washer and the holding case in FIG. 7.

With reference to FIG. 7 and FIG. 8, the relation between the wave washer 50 and the holding portion 42A will be described. FIG. 7 and FIG. 8 show the state where the central axis of the wave washer 50 coincides with the central axis of the holding portion 42A.

As shown in FIG. 7, the wave washer 50 is inserted into the holding portion 42A. As shown in FIG. 8, when a precise circle that passes all of the tops of the multiple outward protrusions 57 is regarded as a virtual circle CX, the maximum outer diameter of the wave washer 50, which is the diameter of the virtual circle CX, is slightly smaller than the inner diameter of the holding portion 42A.

The difference between the maximum outer diameter of the wave washer 50 and the inner diameter of the holding portion 42A is smaller than the difference between the maximum outer diameter of the wave washer 50 and the minimum outer diameter of the wave washer 50, which is the outer diameter of the annular portion 51. Furthermore, the difference between the maximum outer diameter of the wave washer 50 and the inner diameter of the holding portion 42A is equal to a value obtained by doubling a size YA of a clearance between the virtual circle CX and the inner periphery of the holding portion 42A in FIG. 8. The difference between the maximum outer diameter of the wave washer 50 and the minimum outer diameter of the wave washer 50 is equal to a value obtained by doubling the maximum protruded amount DA.

With reference to FIG. 2, the configuration of the speed reducer 60 will be described. The speed reducer 60 has a speed reducer housing 61, a worm wheel 68, the worm shaft 62, a first bearing 65, a second bearing 66, a rubber member that serves as an urging member 67, and a rubber member that serves as a pushing member 69. The worm shaft 62 has a worm distal end portion 63, which is an end portion on the side in the second axial direction ZB, and a worm connection portion 64, which is an end portion on the side in the first axial direction ZA. The worm shaft 62 rotates together with the rotary shaft 31.

The speed reducer housing 61 accommodates the worm wheel 68 and the worm shaft 62. The speed reducer housing 61 is fitted to the stator housing 42. The worm wheel 68 is meshed with the worm shaft 62, and transmits the rotation of the worm shaft 62 to the column shaft 12 (see FIG. 1). The worm connection portion 64 is connected to the rotary shaft 31 via the urging member 67. The worm shaft 62 applies a force headed in the first axial direction ZA, to the rotary shaft 31 via the urging member 67.

The first bearing 65 supports the worm distal end portion 63 of the worm shaft 62. The second bearing 66 supports the worm connection portion 64 of the worm shaft 62. The pushing member 69 is arranged on the outer periphery of the first bearing 65. The pushing member 69 pushes the worm shaft 62 against the worm wheel 68.

When the worm shaft 62 rotates, the worm shaft 62 moves in the first axial direction ZA or the second axial direction ZB with respect to the worm wheel 68 (see FIG. 2). When the worm shaft 62 rotates, the worm shaft 62 moves in the direction W. The worm shaft 62 is pushed at the worm distal end portion 63 against the worm wheel 68 by the pushing member 69. Therefore, a force that causes the worm shaft 62 to tilt with respect to the axial direction Z is applied to the worm shaft 62.

With reference to FIG. 8, the operation of the wave washer 50 will be described. The wave washer 50 has the outward protrusions 57. The clearance between the wave washer 50 and the holding portion 42A is smaller than the clearance between a conventional wave washer without the outward protrusions 57 and the holding portion 42A. Therefore, the maximum offset between the central axis of the wave washer 50 and the central axis of the holding portion 42A is smaller than the maximum offset between the central axis of the conventional wave washer and the central axis of the holding portion 42A. Thus, the positional offset between the wave washer 50 and the front bearing 45 is made small.

The wave washer 50 has the outward protrusions 57 located at the connection portions 56. Thus, the influence exerted on the spring constant by the outward protrusions 57 of the wave washer 50 is smaller than the influence exerted on the spring constant when the outward protrusions 57 are located at the top portions 54C and the top portions 55C.

Because the wave washer 50 has the inner periphery concave portions 53, the width HA is equal to the width HB. Thus, the influence exerted on the spring constant by the outward protrusions 57 of the wave washer 50 is made small.

Figure 9:
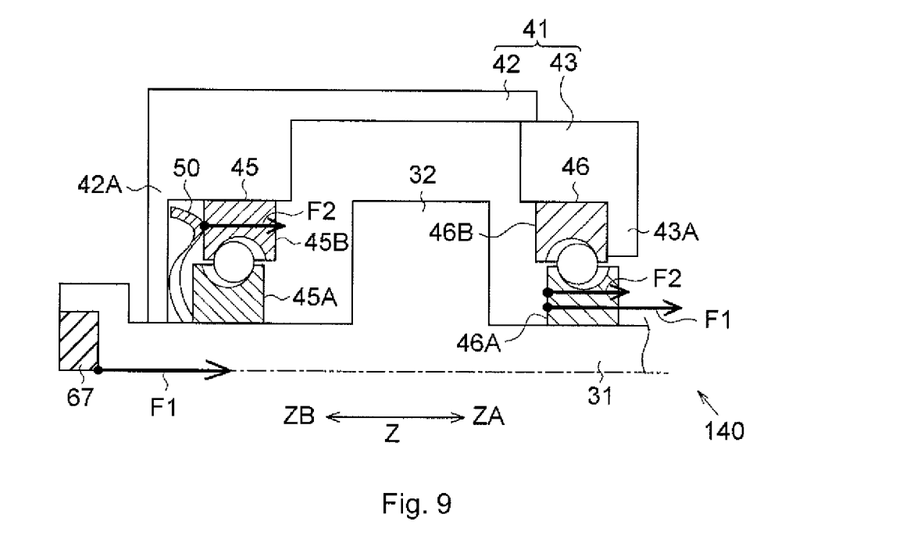
FIG. 9 is a schematic view schematically illustrating preloads applied to a rotary shaft supporting device according to the embodiment.

The operation of the rotary shaft supporting device 40 will be described. As shown in FIG. 9, the urging member 67 applies, via the worm shaft 62 (see FIG. 2), a load F1 headed in the first axial direction ZA, to the rotary shaft 31. The wave washer 50 applies a load F2 headed in the first axial direction ZA, to the front bearing 45.

In the front bearing 45, a preload headed in the first axial direction ZA is applied to the front outer ring 45B by the load F2. In the rear bearing 46, a preload headed in the first axial direction ZA is applied to the rear inner ring 46A by the load F1 and the load F2.

Figures 10, 11:
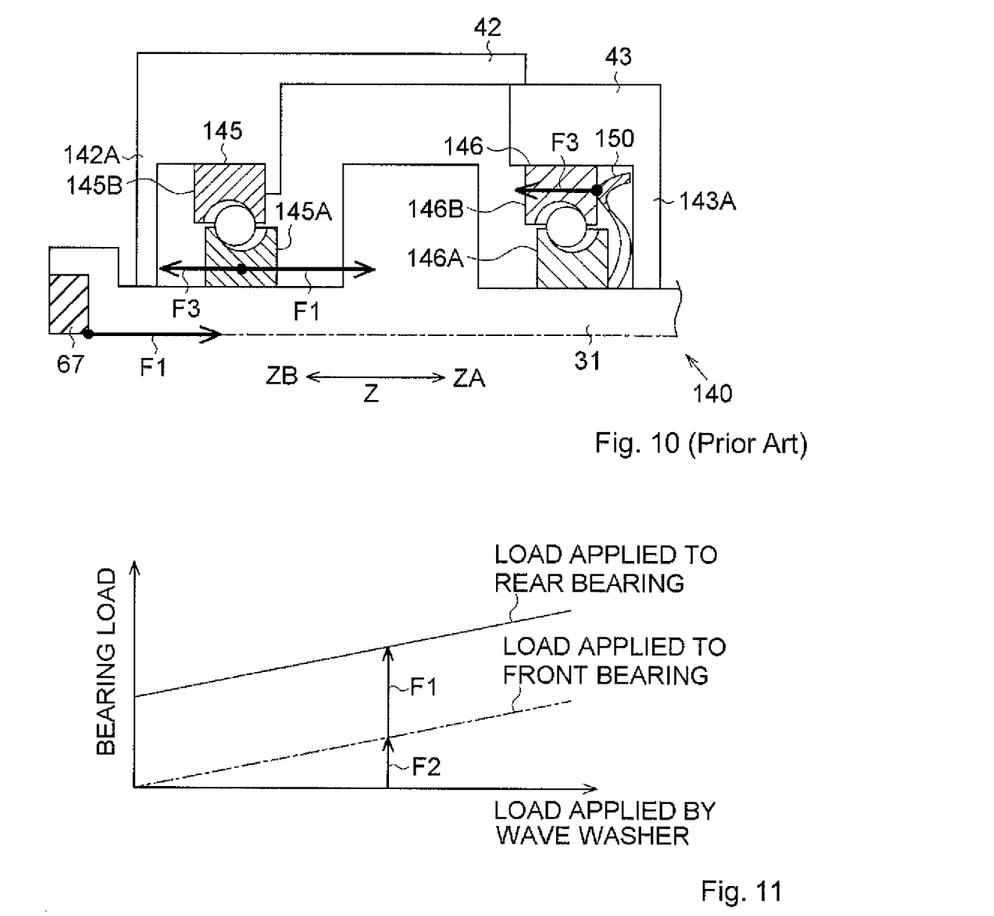
FIG. 10 is a schematic view schematically illustrating preloads applied to a conventional rotary shaft supporting device.
FIG. 11 is a graph illustrating preloads applied to a bearing in the embodiment.

FIG. 10 illustrates a conventional rotary shaft supporting device 140. The conventional rotary shaft supporting device 140 is configured such that a wave washer 150 is provided between a rear bearing 146 and a bearing arranged portion 143A.

A front bearing 145 has a front inner ring 145A and a front outer ring 145B. The front inner ring 145A is press-fitted to the rotary shaft 31. The front outer ring 145B is held by a holding portion 142A.

The rear bearing 146 has a rear inner ring 146A and a rear outer ring 146B. The rear inner ring 146A is press-fitted to the rotary shaft 31. The rear outer ring 146B is clearance-fitted to a bearing arranged portion 143A.

The wave washer 150 applies a load F3 headed in the second axial direction ZB, to the rear bearing 146. In the front bearing 145, a preload headed in the first axial direction ZA is applied to the front inner ring 145A by a load F1 from the urging member 67.

In the rear bearing 146, a preload headed in the second axial direction ZB is applied to the rear outer ring 146B by the load F3. At this time, a preload headed in the second axial direction ZB is applied to the front inner ring 145A of the front bearing 145 by the load F3. Because the load F3 is a force headed in a direction opposite to the direction of the load F1, the preload applied to the front bearing 145 is decreased.

Figure 12:
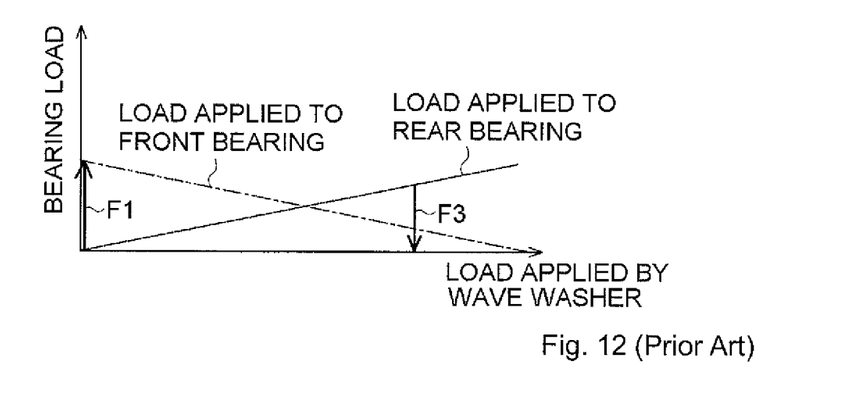
FIG. 12 is a graph illustrating preloads applied to a bearing in the conventional rotary shaft supporting device.

The operation of the rotary shaft supporting device 40 will be described on the basis of a comparison between the rotary shaft supporting device 40 and the conventional rotary shaft supporting device 140. As shown in FIG. 12, with regard to the bearing load in the conventional rotary shaft supporting device 140, the load applied to the rear bearing 146 (i.e., preload) is increased as the load F3 applied by the wave washer 150 increases. On the other hand, the load applied to the front bearing 145 (i.e., preload) is decreased as the load F3 applied by the wave washer 50 increases.

On the other hand, as shown in FIG. 11, with regard to the bearing load in the rotary shaft supporting device 40, the load applied to the front bearing 45 and the load applied to the rear bearing 46 are increased as the load F2 applied by the wave washer 50 increases.

The electric power steering system 1 according to the present embodiment produces the following advantageous effects.

(1) The wave washer 50 has a plurality of the outward protrusions 57. Therefore, when the wave washer 50 is arranged radially inward of the holding portion 42A, which may function as a holding member, the difference between the maximum outer diameter of the wave washer 50 and the inner diameter of the holding portion 42 is made smaller due to the outward protrusions 57. Thus, the positional offset between wave washer 50 and the front bearing 45, which serves as a target member, is made smaller than the positional offset between the conventional wave washer without the outward protrusions 57 and the front bearing 45.

(2) The outward protrusions 57 of the wave washer 50 are located at the connection portions 56 between the top portions 54C of the first protrusions 54 and the top portions 55C of the second protrusions 55. Thus, the influence exerted on the spring constant by the outward protrusions 57 of the wave washer 50 is smaller than the influence exerted on the spring constant when the outward protrusions 57 are located at the top portions 54C and the top portions 55C.

When the spring constant of the wave washer 50 is increased, a change in the maximum outer diameter of the wave washer 50 is suppressed by increasing the outer diameter of the annular portion 51 and reducing the maximum protruded amount DA of each outward protrusion 57. On the other hand, when the spring constant of the wave washer 50 is decreased, a change in the maximum outer diameter of the wave washer 50 is suppressed by decreasing the outer diameter of the annular portion 51 and increasing the maximum protruded amount DA of each outward protrusion 57. Thus, the degree of freedom in the spring constant of the wave washer 50 is made high. Further, the number of components is made smaller than that in a configuration where a positioning member is provided between the wave washer 50 and the holding portion 42A.

(3) The annular portion 51 has the inner periphery concave portions 53 located at the portions that correspond to the outward protrusions 57 in the radially inward direction RB of the radial direction R. Each inner periphery concave portion 53 is recessed toward the corresponding outward protrusion 57. Thus, in the wave washer 50, the difference between the width HA of a portion with the outward protrusion 57 and the width HB of a portion without the outward protrusion 57 is small. Thus, the influence exerted on the spring constant by the outward protrusions 57 of the wave washer 50 is made small.

(4) The wave washer 50 is configured such that the maximum recessed amount EA of each inner periphery concave portion 53 is equal to the maximum protruded amount DA of each outward protrusion 57. Thus, the wave washer 50 is configured such that the width HA of a portion, at which the protrusion amount of the outward protrusion 57 is the maximum protrusion amount DA, is equal to the width HB of a portion without the outward protrusion 57. Thus, the influence exerted on the spring constant by the outward protrusions 57 of the wave washer 50 is made smaller.

(5) In the rotary shaft supporting device 40, the wave washer 50 applies a load headed in the axial direction Z, to the front bearing 45. Thus, the movement of the front bearing 45 in a thrust direction is suppressed by the wave washer 50.

(6) In the rotary shaft supporting device 40, the difference between the maximum outer diameter of the wave washer 50 and the inner diameter of the holding portion 42A is smaller than the difference between the maximum outer diameter of the wave washer 50 and the minimum outer diameter of the wave washer 50. That is, the maximum offset amount between the central axis of the wave washer 50 and the central axis of the holding portion 42A is small. Thus, the positional offset between the wave washer 50 and the front bearing 45 is reduced.

(7) In the rotary shaft supporting device 40, a preload headed in the first axial direction ZA is applied to both the front bearing 45 and the rear bearing 46. That is, because the preload applied to the front bearing 45 and the preload applied to the rear bearing 46 are headed in the same direction, it is possible to reduce the possibility that appropriate preload will not be applied to the front bearing 45 and the rear bearing 46.

(8) The electric power steering system 1 includes the speed reducer 60 including the worm shaft 62 and the worm wheel 68. The speed reducer 60 applies a force headed in the first axial direction ZA, to the rotary shaft 31 via the urging member 67. In the rotary shaft 31, the runout at a portion supported by the rear bearing 46 is larger than the runout at a portion that is connected to the worm shaft 62 and that is supported by the front bearing 45. In the rotary shaft supporting device 40, the load F1 and load F2 are applied to the rear bearing 46. That is, the load that is applied to the rear bearing 46 is larger than that in the conventional rotary shaft supporting device 140. Thus, in the electric power steering system 1, the runout of the portion supported by the rear bearing 46 of the rotary shaft 31 is reduced.

(9) In the rotary shaft supporting device 40, the rear outer ring 46B is held by the bearing holding portion 43A. Therefore, the runout of the portion of the rotary shaft 31, which is supported by the rear bearing 46, is suppressed.

(10) The rotary shaft supporting device 40 has the O-ring 44. Therefore, the radial runout of the front bearing 45 with respect to the holding portion 42A is suppressed. Furthermore, abnormal noise that is caused by the contact between the front bearing 45 and the holding portion 42A is reduced.

The electric power steering system 1 may be implemented in embodiments other than the above-described embodiment. Hereinafter, modified examples of the above-described embodiment will be described as the other embodiments of the electric power steering system 1. The following modified examples may be combined with each other.

Figure 13:
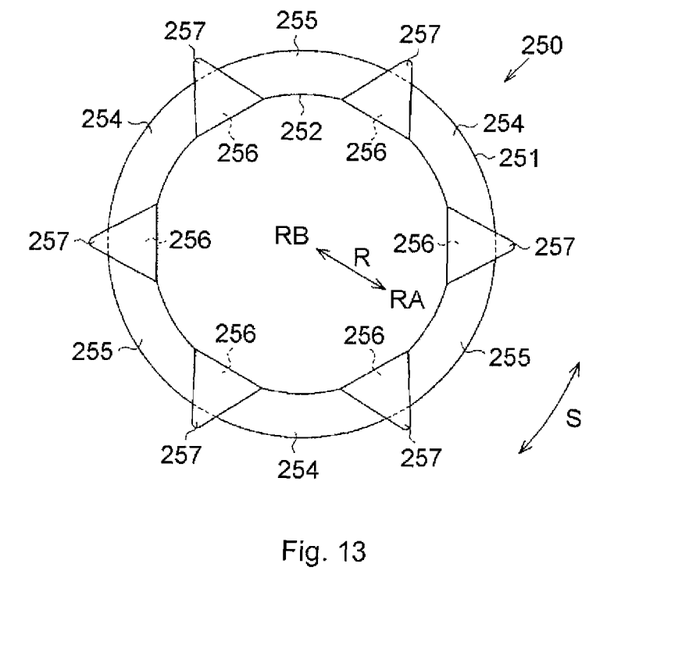
FIG. 13 is a front view illustrating a wave washer according to another embodiment of the invention.
Figure 14:
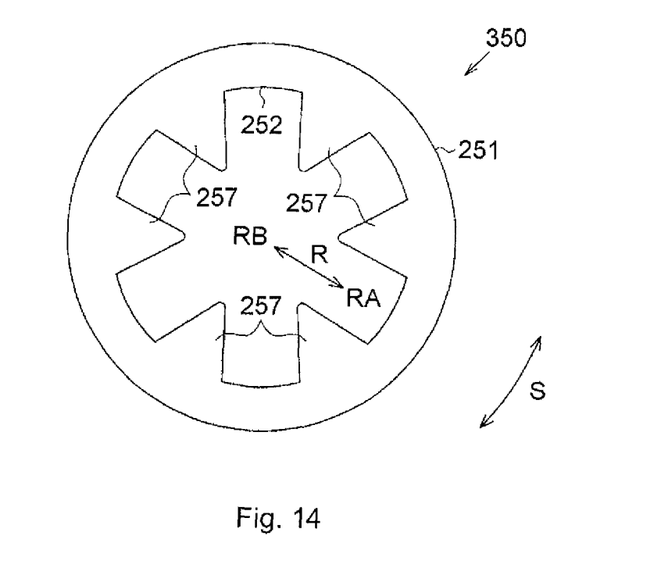
FIG. 14 is a front view illustrating a process of manufacturing the wave washer in FIG. 13.

The wave washer 50 according to the embodiment has the outward protrusions 57 that are continuous with the outer periphery of the annular portion 51. On the other hand, a wave washer 250 shown in FIG. 13 has outward protrusions 257 that are continuous with an inner periphery 252 of an annular portion 251. The outward protrusions 257 are formed by bending, in the radially outward direction RA, the outward protrusions 257 continuous with the inner periphery 252 of the annular portion 251 of a washer material 350 obtained by punching a metal plate as shown in FIG. 14. First protrusion 254 and second protrusions 255 of the wave washer 250 are formed by bending the outward protrusions 257 of the washer material 350 in the radially outward direction RA and then deforming the washer material 350. Therefore, in the wave washer 250, the outward protrusions 257 are partially overlapped with the connection portions 256.

The wave washer 50 according to the above-described embodiment has the six outward protrusions 57. On the other hand, one to five outward protrusion(s) 57 may be omitted from the wave washer 50, according to a modified example. In the case where the wave washer 50 has two or more outward protrusions 57, when the two outward protrusions 57 are arranged at positions offset from each other by 180 degrees in the circumferential direction S of the wave washer 50, the virtual circle CX has a diameter equal to that of the wave washer 50 having six outward protrusions 57.

In the case where the wave washer 50 has three or more outward protrusions 57, when the three outward protrusions 57 are arranged at positions that are offset from each other by 120 degrees in the circumferential direction S of the wave washer 50 (i.e., when every other connection portion 56 has the outward protrusion 57), the virtual circle CX has a diameter equal to that of the wave washer 50 having the six outward protrusions 57.

When the wave washer 50 has only one outward protrusion 57, the wave washer 50 has the maximum outer diameter larger than that of the conventional wave washer without the outward protrusions 57. Therefore, the positional offset between the wave washer 50 and the front bearing 45 is reduced.

The wave washer 50 in the embodiment is configured such that the center position of each outward protrusion 57 in the axial direction Z coincides with the center position of the wave washer 50 in the axial direction Z. On the other hand, the wave washer 50 in a modified example is configured such that the center position of each outward protrusion 57 in the axial direction Z is offset in the first axial direction ZA or the second axial direction ZB from the center position of the wave washer 50 in the axial direction Z.

In the wave washer 50 according to the above-described embodiment, the outward protrusions 57 are protruded from the connection portion 56 in the radially outward direction RA. On the other hand, in the wave washer 50 according to a modified example, the outward protrusions 57 are protruded from the top portions 54C or the top portions 55C in the radially outward direction RA.

In the wave washer 50 according to the above-described embodiment, each outward protrusion 57 has an arc shape. On the other hand, in the wave washer 50 according to a modified example, each outward protrusion 57 has a triangular shape or a rectangular shape.

The wave washer 50 according to the above-described embodiment has the inner periphery concave portions 53. On the other hand, the inner periphery concave portions 53 are omitted from the wave washer 50, according to a modified example.

Each inner periphery concave portion 53 of the wave washer 50 according to the embodiment has an arc shape. On the other hand, in the wave washer 50 according to a modified example, each inner periphery concave portion 53 has a triangular shape or a rectangular shape.

The wave washer 50 according to the above-described embodiment is configured such that the maximum protruded amount DA of each outward protrusion 57 is equal to the maximum recessed amount EA of each inner periphery concave portion 53. On the other hand, the wave washer 50 according to a modified example is configured such that the maximum recessed amount EA of each inner periphery concave portion 53 is larger than the maximum protruded amount DA of each outward protrusion 57, or the maximum recessed amount EA of each inner periphery concave portion 53 is smaller than the maximum protruded amount DA of each outward protrusion 57.

The wave washer 50 according to the above-described embodiment is configured such that each outward protrusion 57 has a shape that coincides with the shape of each inner periphery concave portion 53. On the other hand, the wave washer 50 according to a modified example is configured such that each outward protrusion 57 has a shape different from that of each inner periphery concave portion 53.

The wave washer 50 according to the above-described embodiment has the three first protrusions 54 and the three second protrusions 55. On the other hand, in the wave washer 50 according to a modified example, the number of the first protrusions 54 and the number of the second protrusions 55 are each two or less, or four or more.

The rotary shaft supporting device 40 according to the above-described embodiment has the O-ring 44. On the other hand, the O-ring 44 is omitted from the rotary shaft supporting device 40, according to a modified example.

The rotary shaft supporting device 40 according to the above-described embodiment has the rubber member as the urging member 67. On the other hand, the rotary shaft supporting device 40 according to a modified example has a coil spring as the urging member 67.

The rotary shaft supporting device 40 according to the above-described embodiment is configured such that the wave washer 50 is arranged between the front bearing 45 and the holding portion 42A. On the other hand, the rotary shaft supporting device 40 according to a modified example is configured such that the wave washer 50 is arranged between the rear bearing 46 and the bearing holding portion 43A.

The wave washer 50 according to the above-described embodiment is used as the wave washer of the rotary shaft supporting device 40. However, the wave washer 50 according to the above-described embodiment may be used as any wave washer that is arranged in a holding member.

The rotary shaft supporting device according to the above-described embodiment is used as the rotary shaft supporting device for the electric motor 30. However, the rotary shaft supporting device according to the above-described embodiment may be used as any rotary shaft supporting device other than the rotary shaft supporting device for the electric motor 30 as long as the rotary shaft supporting device is a rotary shaft supporting device that supports a rotary shaft with the use of a wave washer.

The electric motor 30 according to the above-described embodiment is used as the electric motor 30 of the electric power steering system 1. However, the electric motor 30 according to the above-described embodiment may be used for any apparatus other than the electric power steering system 1 so long as the apparatus includes an electric motor.

What is claimed is:
1. A wave washer, comprising:
an annular portion having a first protrusion that protrudes toward one side only in an axial direction of the wave washer, and a second protrusion that is formed so as to be continuous with the first protrusion and that protrudes toward the other side only in an axial direction; and a plurality of outward protrusions that protrude outward from an outer periphery of the annular portion in a radial direction of the annular portion, wherein the annular portion has inner periphery concave portions that are formed at portions radially inward of portions at which the outward protrusions are formed;

the inner periphery concave portions have recessed portions in a plane perpendicular to the axial direction away from a center of the annular portion radially outwardly toward the outward protrusions;

a maximum radially recessed amount of each of the inner periphery concave portions is equal to a maximum radially protruded amount of each of the outward protrusions.

2. The wave washer according to claim 1, wherein:

the first protrusion includes a top portion that protrudes the farthest in the axial direction, and the second protrusion includes a top portion that protrudes the farthest toward the other side in the axial direction; and each of the outward protrusions is formed at a connection portion located between the top portion of the first protrusion and the top portion of the second protrusion in the axial direction.

3. The wave washer according to claim 1, wherein:

each of the outward protrusions has an arc shape; and each of the inner periphery concave portions has an arc shape.

4. A rotary shaft supporting device, comprising:

a rotary shaft;

a rolling bearing by which the rotary shaft is rotatably supported;

a holding member having a holding portion that holds the rolling bearing; and the wave washer according to claim 1, which is provided between the rolling bearing and the holding portion in an axial direction of the rotary shaft, and into which the rotary shaft is inserted.

5. The rotary shaft supporting device according to claim 4, wherein, where a diameter of a virtual precise circle that passes all of tops of the plurality of the outward protrusions is a maximum outer diameter of the wave washer and an outer diameter of the annular portion is a minimum outer diameter of the wave washer, a difference between the maximum outer diameter of the wave washer and an inner diameter of the holding portion is smaller than a difference between the maximum outer diameter of the wave washer and the minimum outer diameter of the wave washer.

6. An electric motor, comprising:

the rotary shaft supporting device according to claim 4, wherein the rotary shaft supporting device supports the rotary shaft.

7. The electric motor according to claim 6, wherein:

the electric motor includes an output shaft connected to the rotary shaft, a front bearing as the rolling bearing that supports the rotary shaft and that is arranged on a front side which is closer to the output shaft than a rotor of the electric motor, a rear bearing that supports the rotary shaft and that is arranged on a rear side which is on an opposite side of the rotor from the front side, and an urging member;

the wave washer applies a load along a direction from the front side to the rear side, to the front bearing; and the urging member is provided at an output shaft-side end portion of the rotary shaft, and applies a load along the direction from the front side to the rear side, to the rear bearing.

* * * * *